United States Patent [19]
Totino

[11] 3,938,758
[45] Feb. 17, 1976

[54] SIMPLIFIED TAPE DRIVE

[75] Inventor: Peter J. Totino, West New York, N.J.

[73] Assignee: Quasar Microsystems, Inc., Brentwood, N.Y.

[22] Filed: Nov. 15, 1973

[21] Appl. No.: 415,953

[52] U.S. Cl. .............................. 242/201; 242/208
[51] Int. Cl.² ..................... G03B 1/04; G11B 15/32
[58] Field of Search ............ 242/201, 202, 203, 204, 242/192, 199, 208, 210

[56] References Cited
UNITED STATES PATENTS

| | | | |
|---|---|---|---|
| 2,673,041 | 3/1954 | Hittle | 242/192 |
| 2,813,686 | 11/1957 | Schroter | 242/204 |
| 2,873,926 | 2/1959 | Roberts | 242/204 |
| 2,948,485 | 8/1960 | Cotte | 242/201 |
| 3,133,710 | 5/1964 | Herterich | 242/201 |
| 3,211,014 | 10/1965 | Sanderson | 242/201 |
| 3,259,331 | 7/1966 | Liddle | 242/199 |

*Primary Examiner*—Leonard D. Christian
*Attorney, Agent, or Firm*—Friedman & Goodman

[57] ABSTRACT

In a tape drive having a supply reel and a take-up reel, a drive mechanism for advancing and rewinding the tape includes a platform generally disposed between the reels. The platform is pivotally mounted for free pivotal movement in a plane between first and second positions. The rim of the take-up reel is spaced above the rim of the supply reel. A drive disc, rotatably mounted on the platform, is frictionally engaged with a shaft of a reversible motor. The drive disc includes concentric smaller and larger diameter discs spaced from each other along their axes and fixed to one another for simultaneous rotation. The larger diameter disc is disposed at the level of and is engageable only with the rim of the supply reel and the smaller diameter disc is disposed at the level of and is engageable only with the rim of the take-up reel. The position of the drive disc is determined by the direction of rotation of the motor shaft. The smaller diameter disc moves to the first position to engage the take-up reel and turn the latter when the motor shaft turns in one direction. The large diameter moves to the second position to engage the supply reel and turn the latter when the motor shaft turns in the other direction. In this manner, rewinding of the tape, by turning the supply reel, is at a higher speed than advancing the tape by turning the take-up reel.

13 Claims, 9 Drawing Figures

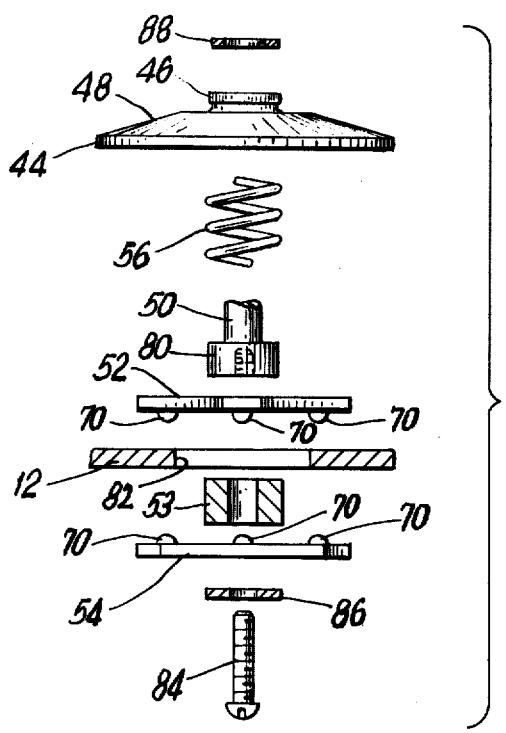
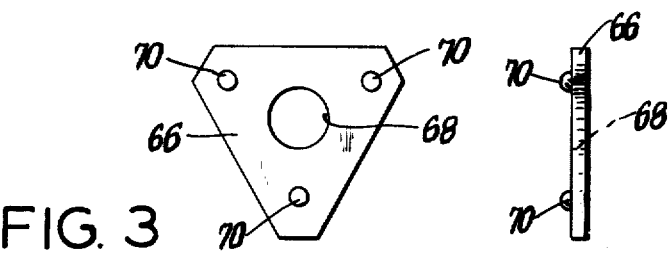
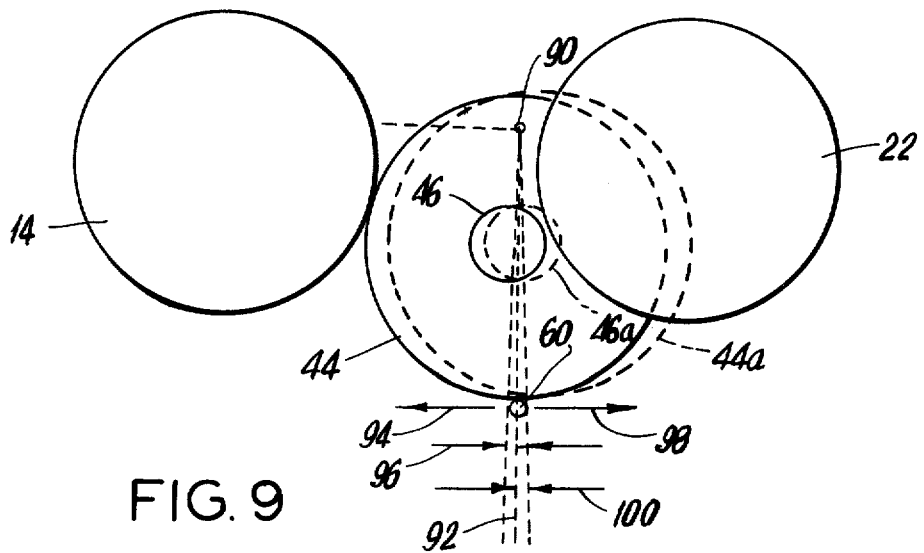

3,938,758

SIMPLIFIED TAPE DRIVE

BACKGROUND OF THE INVENTION

The present invention generally relates to tape drives, and more particularly to a simplified tape drive which permits normal advancement of the tape at one speed and rewinding of the tape at a higher speed without the utilization of expensive electrical components or complex mechanical linkage arrangements.

The tape drives for actuating a pair of reels to transfer tape from one reel to the other and for rewinding the tape are already well known. Such tape drives are commonly utilized in various types of audio tape recorders as well as in tape drives for computer applications. However, the prior art tape drives have had serious drawbacks. Firstly, the known tape drives have generally been complex in construction and costly to manufacture. Since most presently used tape drives rely on a capstan-pinch roller arrangement, the tape drives have generally required involved mechanical linkage arrangements for assuring proper engagement between the pinch roller and the capstan. Further, since the tape to be advanced or rewound is disposed between the capstan and the pinch roller, frictional forces are applied to the tape. This has sometimes resulted in damage to the tape. Moreover, mechanical or electro-mechanical means must be provided to disengage the pinch roller from the capstan in the rewind and the fast forward modes.

Most known tape drive mechanisms utilize a unidirectional motor which, necessarily, requires complex mechanical linkages to permit the rewinding of the tape. Such mechanical linkages, in addition to the additional space and weight which they contribute, increase the cost of construction of the tape drive. In this connection, most tape drives of the type under discussion have required, in the prior art, manual operation of the tape drive to cause a realignment of the mechanical linkages to provide the rewind function. For this reason, the tape drives frequently cannot be operated remotely without the utilization of expensive electrical components, such as solenoids.

Also known in the prior art are rim drives wherein a drive wheel frictionally engages the rims of the reels on which the tape is wound. However, except for the elimination of the pinch roller and capstan, the prior art rim drives have suffered the same disadvantages above discussed in connection with the mechanical linkage arrangements for providing the rewind function.

Generally, the prior art constructions have been complex and have not permitted an inexpensive method of controlling the tape drive from a remote location.

Another feature generally considered to be important with respect to tape drives is the availability of different speeds for advancement and rewinding of the tape.

Many prior art tape drives rewind the tape at the same speed as they advance the tape. In some other tape drives, different speeds have been achieved by providing dual motors, one motor being utilized for advancing the tape while the other motor is utilized for rewinding the tape at a different speed. This, clearly, has represented an additional expense which has increased the overall cost of the tape drive.

A further disadvantage of some of the presently known tape drives rests in the fact that these require fly wheels and pulle systems for reducing the speeds of the motor shafts to the desired speeds for rotation of the reels. Fly wheels are also frequently required, when utilizing high speed motors, to stabilize the speed at which the reels advance and to maintain the speed and fluctuations at a minimum. However, fly wheels and pulle systems are generally expensive and space consuming.

SUMMARY OF THE INVENTION

It is an object of the present invention to provide a simplified tape drive which does not present the above described disadvantages associated with comparable prior art tape drives.

It is another object of the present invention to provide a tape drive which is simple in construction and economical to manufacture.

It is still another object of the present invention to provide a tape drive of the type under discussion which does not use a pinch roller and capstan arrangement but instead utilizes a rim drive arrangement.

It is yet another object of the present invention to provide a simplified tape drive which does not require fly wheels and pulle systems for reducing the motor speeds or for minimizing the fluctuations of the speed of the motor.

It is a further object of the present invention to provide a tape drive which utilizes one D.C. motor which can be utilized both for take-up and for rewinding of the tape.

It is still a further object of the present invention to provide a tape drive which can be advanced or rewound remotely by reversing the direction of motor rotation without the utilization of expensive solenoids or complex mechanical linkage systems.

It is yet a further object of the present invention to provide a simplified tape drive utilizing a small number of mechanical parts and which utilizes the direction of rotation of a single D.C. motor for correspondingly changing the directions of movement of the tape.

It is an additional object of the present invention to provide a simplified tape drive as above suggested which includes a pair of concentric smaller and large diameter drive discs which are respectively adapted to selectively engage a rim of one of two tape reels, whereby the selective positioning of the drive discs provides advancement and rewinding of the tape at different speeds.

It is still an additional object of the present invention to provide a simplified tape drive of the tape under consideration which utilizes a floating platform on which is rotatably mounted one or two drive discs engageable with a supply or take-up reel in response to rotation of a motor shaft in one direction or another.

In order to achieve the above objects, as well as other objects which will become apparent hereafter, the present invention will be described in conjunction with a tape drive having a supply reel and a take-up reel rotatably mounted on a deck and a magnetic head positioned in the path of the tape moving from on the other of the reels. The improvement of the present invention comprises drive means for advancing and rewinding the tape. The drive means includes a platform generally disposed between the reels and being pivotally mounted on the deck for free pivotal movement on a plane between first and second positions. A drive disc is rotatably mounted on the platform, said platform being movable with said drive disc about the pivot point of the former between said first and second positions. A motor shaft frictionally engages the periphery of said drive disc for rotating the latter. The position of said drive disc with respect to the pivot point of said platform is determined by the direction of rotation of said motor shaft. The drive disc moves to said first position to engage one of said reels and turn the latter when the motor shaft turns in one direction. Said drive disc moves to said second position to engage the other of said reels and turn the latter when said motor shaft turns in the other direction.

In accordance with a presently preferred embodiment, wherein the deck has an opening therein, said platform comprises two spaced planar plates each disposed on another side of the deck. Connecting means are provided which extends through the opening in the deck for drawing said plates towards each other and into abutment against the opposite surfaces of the deck. Advantageously, each of said plates is provided with spaced protuberances about the respective peripheries of the surfaces facing the opposing surfaces of the tape deck. Said protuberances abut against said plates and are slidably movable relative to the tape deck. In this connection, lubricating means is advantageously provided between said protuberances and the deck to minimize frictional forces developed therebetween.

Friction means are provided disposed between said drive disc and said platform for transmitting torquing or rotational forces to the latter in response to rotary movement of said drive disc on said shaft. In the preferred embodiment, the friction means is in the form of a helical spring mounted concentrically on the shaft, the opposing free ends of the spring frictionally abutting against said drive disc and said platform.

Biasing means are provided for urging said platform in the direction of said motor shaft to thereby insure frictional engagement between said drive disc and said motor shaft. In the presently preferred embodiment, said biasing means is in the form of an elongate resilient wire or spring having one end coupled to said platform. With such an arrangement, the resilient wire end coupled to the platform also acts as a pivot point about which the platform can pivot in said plane.

One possible arrangement for permitting different speeds for advancing and rewinding the tape involves spacing of the rim of the take-up reel above the rim of the supply reel. Said drive disc now comprises coaxial smaller and large diameter discs vertically spaced from one another along the axes thereof and fixed to one another for simultaneous rotation. The larger diameter disc is disposed at the level of and is engageable only with the rim of the supply reel. The smaller diameter disc is disposed at the level of and is engageable only with the rim of the take-up reel. In this manner, rewinding of the tape by turning the supply reel is at a higher speed than advancing the tape by turning the take-up reel. To insure proper rim drive operation, friction surfaces are provided about the peripheries of both the smaller and larger diameter discs to thereby insure proper engagement between the latter discs and the reels as well as with the motor shaft.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 3 is a top plan view of one of the floating plates shown in FIG. 2;

FIG. 4 is a side elevational view of the floating plate shown in FIG. 3, more clearly showing the nipples which project from one surface of the floating plate and which are adapted to slidingly abut against the tape deck;

FIG. 8 is an exploded view of the floating platform assembly shown in FIG. 7; and FIG. 9 is a schematic representation of the fixed reels and the movable drive discs rotatably mounted on the floating platform, showing the two positions between which the floating discs are movable to selectively frictionally engage one or the other of the reels to either advance or rewind the tape.

DETAILED DESCRIPTION OF THE PREFERRED EMBODIMENTS

Figure 1:
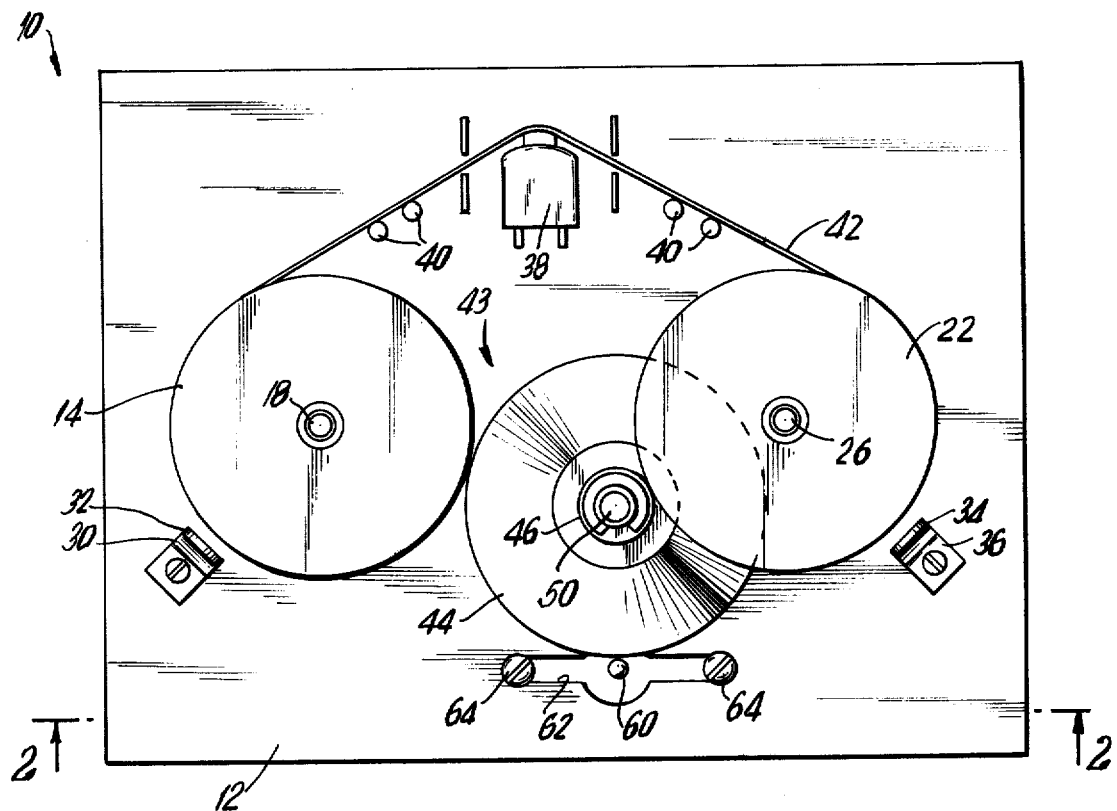
FIG. 1 is a top plan view of a tape deck on which are mounted two tape reels having rims about the peripheries thereof and a drive disc in accordance with the present invention engaging the take-up reel to advance the tape.
Figure 2:
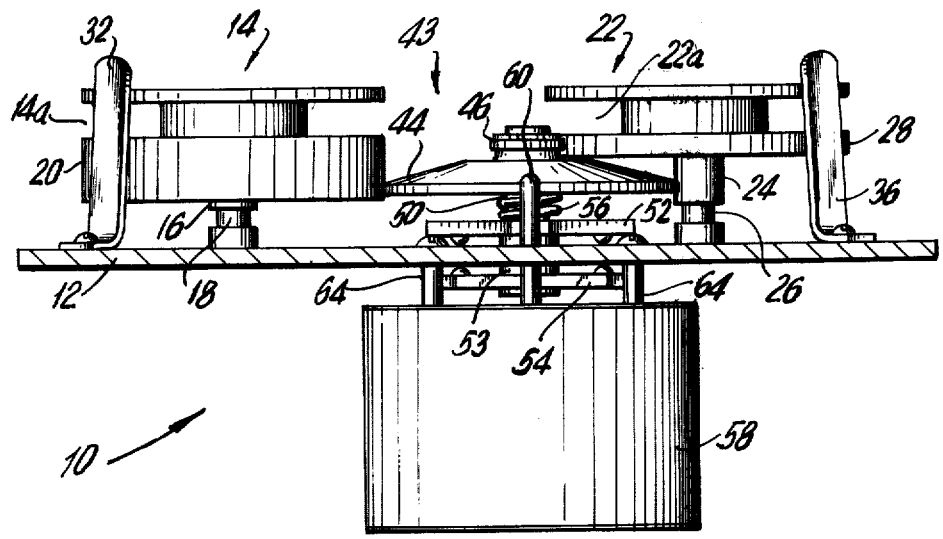
FIG. 2 is a cross-section of the tape deck shown in FIG. 1, taken along line 2—2.

Referring now to the drawings, in which similar or identical parts have been designated by the same reference numerals throughout, and first referring to FIGS. 1 and 2, a tape drive assembly is generally designated by the reference numeral 10.

The tape drive assembly 10 includes a tape deck 12 which is in the form of a planar sheet or wall typically comprising the top wall of a tape drive assembly enclosure or housing.

Mounted on the deck 12 are two spaced tape reels typical of the type utilized in rim drives. The reel 14, in the arrangement to be described, comprises the supply reel and is provided with a tape receiving space 14a.

The supply reel 14 has depending therefrom a hub, sleeve or post 16 which projects downwardly therefrom, as shown in FIG. 2. The hub 16 is rotatably mounted on a shaft 18 which is fixedly mounted on the deck 12 in any conventional manner.

The supply reel 14 is provided with an enlarged rim 20 whose height or elevation above the deck 12 is selected in a manner to be described hereafter.

Spaced from the supply reel 14, on the same side of the tape deck 12, is a take-up reel 22 provided with a tape receiving space 22a. The take-up reel 22 is similarly provided with a hub 24 which, however, has a length along its respective shaft 26 which is greater than the corresponding length of the hub 16. The shaft 26 is similarly fixedly mounted on the deck 12 in a conventional manner.

An important feature of the present invention is the provision of a narrow rim 28 on the take-up reel 22, for reasons which will become apparent hereafter. However, it should be noted that the broader aspects of the present invention contemplate the utilization of two reels which are similar or identical in construction. The circumstances under which such similar reels may be utilized will be described hereafter.

The tape receiving spaces 14a and 22a are disposed at equal elevations above the deck 12 to thereby permit the transfer of tape from one reel to the other in a conventional manner without damage to the tape.

Each of the reels 14 and 22 are rotatably mounted on their respective shafts 18 and 26. To prevent continued rotation of these reels about their shafts after they are no longer driven, due to angular momentum which they have acquired during advancement of rewinding of the tape, a pad 30 is mounted on a pad supporting member 32. The pad supporting member 32 is in the form of a resilient finger which resiliently urges the pad 30 against the periphery of the supply reel 14. The pad 30 maybe of any suitable material, such as felt. Similarly, a pad 34 is mounted on a pad support member or resilient finger 36 which applies comparable frictional forces to the periphery of the take-up reel 22. With this arrangement, it is assured that each of the respective reels ceases to rotate soon after the drive means to be described as decoupled therefrom. In this manner, undesired rotation of the reels about their respective shafts is prevented as is the slackening or undesirable unwinding of the tape from the reels.

Disposed on the tape deck 12 is a conventional magnetic head 38 which is positioned in the path, determined by guide posts 40, of the tape 42. The specific nature of the magnetic head 38 and of the guide means for determining the path of the tape 42 are not critical features of the present invention.

In a tape recording and reproducing arrangement as above described, a tape drive arrangement 43 of the present invention comprises a larger diameter drive wheel or disc 44 and a smaller diameter coaxial wheel or disc 46 spaced above the drive disc 44, as viewed in FIG. 2. The drive discs 44 and 46 are affixed to one another by means of a skirt 48. The coaxial drive discs are mounted on a shaft 50 projecting or extending upwardly from a floating plate 52.

The floating plate 52, on one side of the deck 12 is spaced by a spacer 53 from a lower floating plate 54, on the other side of the deck 12. The height of the spacer 53 is selected to permit rigid interconnection of the plates to space the latter sufficiently to engage the deck 12 without forceably abutting thereagainst. Accordingly, the plates 52 and 54 can be fixedly connected to one another and slidably moved along the surfaces of the deck 12, as to be described hereafter. The drive discs 44 and 46 are rotatably mounted on the shaft 50 relative to the plates 52 and 54.

Due to the typically low frictional forces developed between the discs 44 and 46 and the shaft 50, a helical spring 56 is mounted coaxially with the shaft 50. The free ends of the spring 56 respectively abut against the drive discs and the plate 52. In this manner, the rotational movement of the drive discs is transmitted or imparted to the plate 52 for reasons to be described hereafter.

In the presently preferred embodiment, a single D.C. motor 58 is mounted on the under side of the deck 12. The motor shaft 60 projects through an opening 62 in the deck. The motor 58 is supported by the deck 12 in any conventional manner, such as by mounting screws 64.

The position of the motor 58 is selected to bring the shaft 60 into abutment against the periphery of the larger diameter disc 44.

Each of the discs 44 and 46 is provided with a friction surface adapted to frictionally engage the motor shaft 60, as well as the rims 20 and 28. For proper operation of the tape drive, the motor shaft 60 must remain in abutment against the drive disc 44, for reasons to become apparent hereafter. Means for insuring such continued abutting relationship between the drive disc 44 and the motor shaft 60 will be described in connection with FIG. 6.

Figure 5:
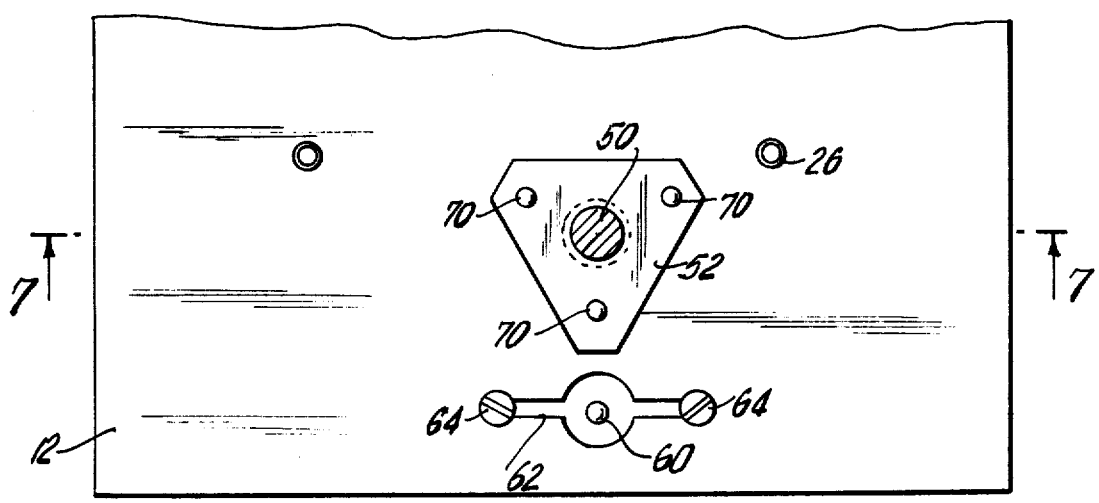
FIG. 5 is a top plan view similar to FIG. 1, with the reels and drive discs removed to show the upper floating plate.

Referring to FIG. 5, the upper floating plate 52 is shown in the form of a triangular plate provided with nipples 70 provided about the periphery thereof on the surface facing the tape deck 12. The shaft 50 projects from and is mounted on the upper floating plate 52.

The motor and the motor shaft are fixed in position on the tape deck 12 by means of the mounting screws 64.

Figure 6:
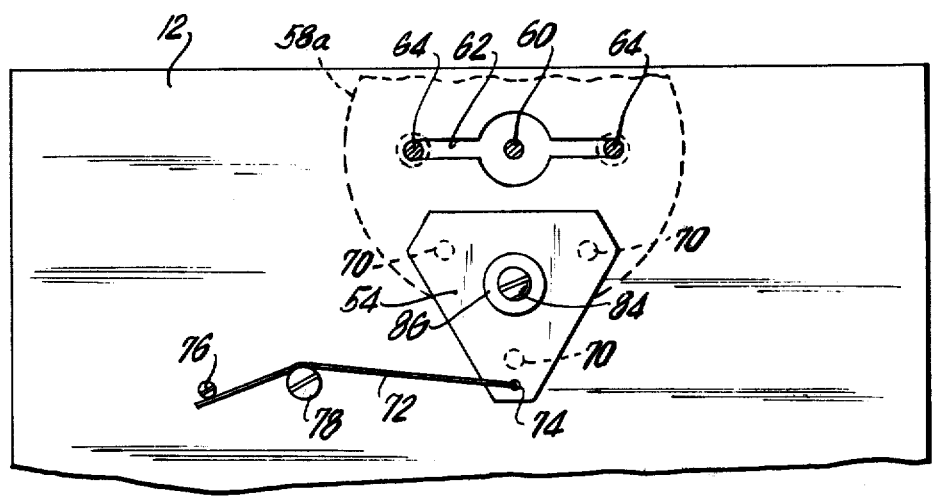
FIG. 6 is a bottom plan view of the tape deck of FIG. 1, showing the lower floating plate and the manner in which a resilient wire spring biases the floating plate towards the motor shaft as well as provides a pivot point for the floating plate.

In FIG. 6, the lower floating plate 54 is shown to be similarly configurated to the upper floating plate 52.

A spring in the form of a resilient wire 72 has one end coupled through a hole 74 provided on a portion of the plate 54 remote from the motor shaft 60. The spring wire 72 is bent or deformed about a post or screw 76 disposed on one side of the wire 72 and a post or screw 78 on the other side of the wire. With the undefected spring wire normally extending along a linear direction, the spring 72 tends to revert to a straight condition. In this state, the spring wire 72 tends to urge the lower floating plate 54 towards the motor shaft 60. The reference numeral 58a represents an outline of the motor 58.

Figure 7:
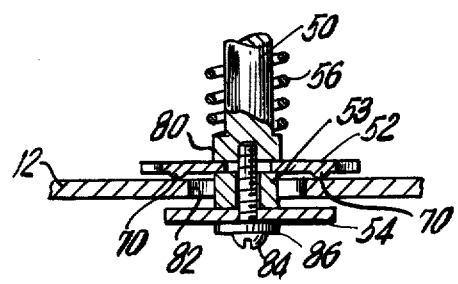
FIG. 7 is a cross-section of the floating platform arrangement shown in FIG. 5, taken along line 7—7.

Referring to FIGS. 7 and 8, important structural features of the present invention are shown. A support block 80 is disposed above the upper floating plate 52 and is provided with a threaded hole on the side thereof facing the tape deck 12. The upper floating plate 52 is positioned to bring the nipples 70 thereof into slidable abutment against the tape deck 12. An opening or hole 82 is provided in the tape deck 12 through which a screw 84 extends into the threaded hole of the support block 80. A washer 86 maybe utilized between the plate 54 and the screw 84. The screw 84 is tightened to draw the upper and lower floating plate 52 and 54 respectively towards each other to effectively sandwich the tape deck 12 between the nipples 70 of the floating plate.

Any conventional lubricating material may be disposed between the nipples 70 and the tape deck 12 to minimize the frictional forces developed between the nipples and the tape deck. With such an arrangement, the floating plates 52 and 54, as well as the shaft 50 can slidably move relative to the tape deck 12 substantially along the surface thereof.

As should be clear from FIG. 7, the hole or opening 82 should be selected to be sufficiently large to permit the floating platform, including the upper and lower floating plates, a predetermined degree of movement without engagement or contact between the screw 84 and the deck 12.

While the above described construction is illustrative of a floating platform which can be utilized to achieve the object of this present invention, any other form of floating platform which permits the pivotal movement of an upwardly extending shaft relative to a tape deck can equally be utilized.

As should now be evident from the above description, and from FIG. 7, the floating platform slidably moves relative to the tape deck 12 as a unit after it is assembled.

In assembling the drive disc assembly, the upper and lower floating plates 52 and 54, with the spacer 53 therebetween, are drawn towards one another by interconnection with the screw 84. With the shaft 50 extending upwardly from the floating plate 52, the spring 56 is placed concentrically on the shaft 50. The drive discs or wheels 44 and 46 are similarly placed on the shaft 50 and the drive discs are retained on the shaft and prevented from inadvertently being separated from the shaft 50 in any conventional manner, such a C-ring or clamp received in an annular slot provided at the top or free end of the shaft 50.

As suggested above, the peripheries of the drive discs 44 and 46 are provided with friction surfaces. In the presently preferred embodiment, bands of rubber are provided about the drive disc peripheries.

Referring to FIG. 2, it is noted that the drive disc 44, in the assembled condition of the drive arrangement, is disposed at the same level as the enlarged rim 20 of the supply reel 14. Also, the drive disc 46 is disposed at the same level as the narrow rim 28 of the take-up reel 22.

The narrow rim 28 is selected to have a smaller height than the enlarged rim 20 so as not to interfere or come into contact with the larger diameter disc 44 which extends below the narrow rim 28. In this connection, the small diameter drive disc 46 is selected to be sufficientley small not to engage or contact the enlarged rime 20.

Generally, therefore, the drive disc 44 is adapted to only be engageable with the supply reel 14 while the drive disc 46 is adapted only to engage the take-up reel 22. To achieve these conditions, the positions of the shafts 18 and 26 must be properly selected. In the examplary embodiment above described, the distance between the shafts 50 and 26 is substantially smaller than the distance between the shafts 18 and 50. More particularly, the difference in distances between each of the shafts 18 and 26 and the shaft 50 is substantially equal to the difference between the diameters of the drive discs 44 and 46.

However, the positions of the shafts 18 and 26 are selected to provide clearances between the enlarged rim 20 and the drive disc 44 as well as between the narrow rim 28 and the drive disc 46 in the inoperative condition of the tape drive when the motor 58 is not actuated and the motor shaft 60 is stationary. However, slight movements of the shaft 50 towards the shaft 18 or the shaft 26 causes one of the drive discs to engage a respective one of the rims of the tape reels.

The motor shaft 60 frictionally engages the periphery of the large diameter drive disc 44. The position of the drive disc is determined by the direction of rotation of the motor shaft 60, as to be described in connection with FIG. 9. The floating platform including the upper and lower plate 52 and 54 shift slightly towards the take-up reel 22, as shown in FIG. 1, when the motor shaft 60 turns in a clockwise direction when viewed in FIG. 1. Clockwise rotation of the motor shaft 60 causes the drive discs 44 and 46 to rotate in a counterclockwise direction as viewed in FIG. 1. When the floating platform slightly shifts towards the shaft 26, in accordance with principles to be described, the smaller diameter drive disc 46 engages the narrow rim 28 of the take-up reel 22 and turns engages the narrow rim 28 of the take-up reel 22 and turns the latter in a clockwise direction at a predetermined advancing speed or rate of transfer from the supply reel 14 to the take-up reel 22.

When the direction of the motor shaft 60 is reversed, as by inverting the terminal voltage to the D.C. motor 58, the motor shaft turns in a counterclockwise direction as viewed in FIG. 1. Counterclockwise rotation of the motor shaft 60 causes the moving platform to pivot slightly about the hole or pivot point 74 and slightly shift towards the shaft 18. The shift in the platform, in the order of thousands of an inch, is sufficient to disengage the drive disc 46 from the narrow rim 28 and cause the drive disc 44 to engage the rim 20. Consequently, with clockwise rotation of the drive disc 46, the supply reel 14 rotates in a counterclockwise direction about the shaft 18. This causes the tape 42 to be rewound on the supply reel 14. However, because the diameter of the drive disc 44 is substantially greater than the diameter of the drive disc 46, the rewinding speed is proportionately greater than the advancing speed of the tape.

Referring to FIG. 9, the reels 14 and 22, as well as the drive discs 44 and 46 are shown schematically to illustrate the principle of operation of the present invention.

The tape reels 14 and 22 are shown fixed in position on the tape deck. The drive discs 44 and 46 are shown to be pivotally movable about the pivot point 90. The pivot point 90, in the above described embodiment, represents the hole 74 to which the resilient spring wire 72 is coupled. As above described, the entire floating platform, including the shaft 50 and the drive discs, are pivotally movable about the pivot point 90. The solid outlines of the drive discs depict one operative position of the drive mechanism. In the condition shown, the larger drive disc 44 is engaged with the supply reel 14. This is achieved by counterclockwise rotation of the motor shaft 60 as above described. With the line 92 representing the neutral position of the shaft 50 wherein neither one of the drive discs engages a corresponding tape reel, counterclockwise movement of the motor shaft 60 causes a frictional force component 94 to develop towards the left, as viewed in FIG. 9. The force component 94 is transmitted to the floating platform by means of the spring 56 which at least partially tends to transmit the rotational movement of the drive discs to the platform. Without frictional forces between the drive discs and the shaft 50, the force component 94 would only provide rotational movement of the discs about the shaft 50 without movement of the floating platform. Consequently, the shaft 50 would substantially remain along the neutral lines 92 and the discs would not engage the tape reels. However, because of the additional frictional forces developed by the spring 56, the force component 94 is partially transmitted to the platform which shifts angularly about the pivot point 90 as is designated by angular displacement 96. This displacement has been shown in an exaggerated form to facilitate the description and to more clearly disclose the invention.

On the other hand, the dashed outlines of the drive discs 44 and 46 represent those positions of the latter wherein the drive disc 46 engages the take-up reel 22 without engagement between the drive disc 44 and the supply reel 14. In this condition, the motor shaft 60 rotates in a clockwise direction and generates a frictional force component 98 along the periphery of the drive disc 44a. This force is at least partially transmitted to the floating platform by means of the friction developing spring 56 as described above. Now, the floating platform shifts slightly about the pivot point 90 to thereby bring the drive disc 46a into abutment against the tape-up reel 22. This movement is represented by the angular displacement 100 with reference to the neutral position 92 of the shaft 50.

Although the angular displacements 96 and 100 have been shown to be approximately equal, this is not a critical feature of the invention and any suitable angular displacements may be selected which insure reliable engagement and disengagement with and from the respective tape reels.

It should be noted that the angular displacements are selected to be sufficiently small to insure that the motor shaft 60 remains in contact with the periphery of the drive wheel 44 in all anticipated positions of the latter. In this manner, continued control of the drive mechanism can be maintained and advancement and rewinding of the tape can be effected by actuating the motor and reversing the polarity of the voltage applied thereto. For this reason, remote control of the tape drive is extremely simple and requires very little mechanical or electrical components to implement such control. Further, the continued contact between the motor shaft 60 and the drive disc 44 is assured by the continuous biasing action of the resilient wire spring 72 upon the floating plate 54, and consequently upon the entire floating platform towards the motor shaft 60.

The above described tape drive included differently sized drive discs 44 and 46. However, where advancement and rewinding of the tape is to be at the same speed, clearly, only one drive disc need be provided which is rotatably mounted on a shaft substantially equally distant from the shafts on which the supply and take-up reels are mounted. On the other hand, by selecting suitable diameters for the drive discs 44 and 46, a large range of different advancing and rewinding speeds are obtainable.

Based on the above, the present invention provides a tape drive which does not utilize a pinch roller-capstan arrangement. Nor does the present invention require fly wheels or pulle systems for stabilizing the speeds of the reels or for reducing motor speeds to tape reel rotational speed. Expensive electrical components such as solenoids or complex linkage systems for reversing the direction of the tape are eliminated. Only one D.C. reversable motor is utilized whose direction of rotation controls the drive arrangement which, by the simple principle above described, advances as well as rewinds the tape at the same or different speeds.

Numerous alterations of the structure herein disclosed will suggest themselves to those skilled in the art. However, it is to be understood that the present disclosure relates to a preferred embodiment of the invention which is for the purposes of illustration only and is not to be construed as a limitation of the invention.

What is claimed is:

1. A tape drive comprising a supply reel and a take-up reel, said supply reel being provided with a wide rim and said take-up reel being provided with a narrow rim, a portion of said supply reel rim extending below said take-up reel rim, said reels being rotatably mounted on a deck, a magnetic head being positioned in a path of tape moving from one to the other of said reels, drive means for advancing and rewinding said tape, said drive means including a platform disposed between said reels, means pivotally mounting said platform on said deck for free pivotal movement in a plane between first and second positions, said platform including a planar plate provided with spaced protuberances distributed about a periphery of one surface of said planar plate, said protuberances abutting against said deck to permit said planar plate to slidably move relative to said deck, a shaft projecting from said plate and being oriented in a direction substantially normal to said plane, a drive disc rotatably mounted on said shaft with said drive disc being movable with said plate about a pivot point of said plate between said first and second positions, friction means disposed between said drive disc and said plate for transmitting rotational forces to said plate in response to rotary movement of said drive disc on said shaft, said friction means including a helical spring mounted concentrically on said shaft with opposing free ends of said spring frictionally abutting against said drive disc and said plate, a motor shaft frictionally engaging a periphery of said drive disc for rotating said drive disc, biasing means connected to said plate for urging said plate in direction of said motor shaft to insure frictional engagement between said drive disc and said motor shaft, said drive disc including coaxial smaller and larger diameter discs vertically spaced from one another along axes thereof and fixed to one another for simultaneous rotation, said larger diameter disc being disposed at a low level to be engageable only with said supply reel rim, said smaller diameter disc being disposed at a higher level to be engageable only with said take-up reel rim, positions of said drive disc with respect to said pivot point of said platform being determined by direction of rotation of said motor shaft, said drive disc moving to said first position to engage said large diameter disc with said supply reel rim for turning said supply reel when said motor shaft turns in one direction, and said drive disc moving to said second position to engage said smaller diameter disc with said take-up reel rim for turning said take-up reel when said motor shaft turns in an opposite direction, whereby rewinding said tape by turning said supply reel is at a higher speed than advancing said tape by turning said take-up reel.

2. In a tape drive as defined in claim 1, further comprising lubricating means provided between said platform and the deck to minimize frictional forces developed therebetween.

3. In a tape drive as defined in claim 1, wherein said plate is metallic, and wherein said protuberances comprise nipples formed in said plate.

4. In a tape drive as defined in claim 1, wherein the deck has an opening therein and wherein said platform comprises two spaced planar plates each disposed on another side of the deck, and connecting means including a spacer extending through the opening in the deck for drawing said plates towards each other to a distance determined by said spacer and into abutment against opposite surfaces of the tape deck without excessive pressure, whereby said plates may slidably move relative to said deck in planes parallel to the latter.

5. In a tape drive as defined in claim 4, wherein each of said plates is provided with spaced protuberances about the respective peripheries of the surfaces facing the opposing surfaces of the tape deck, said protuberances abutting against and said plates being slidably movable relative to the tape deck.

6. In a tape drive as defined in claim 1, whereby said biasing means comprises a spring acting between said platform and the deck.

7. In a tape drive as defined in claim 6, wherein said spring is in the form of an elongate resilient wire having one end coupled to said platform and the other end fixed to the deck, said platform being pivotally mounted at the coupled end of said wire spring.

8. In a tape drive as defined in claim 1, wherein said drive disc is provided with a friction surface about the periphery thereof adapted to frictionally engage said motor shaft.

9. In a tape drive as defined in claim 8, wherein said friction surface is in the form of a band of rubber.

10. In a tape drive as defined in claim 8, where the reels are provided with rims, said friction surface being engageable with another one of the rims in each position of said drive disc.

11. In a tape drive as defined in claim 1, wherein a motor is provided on the deck on the side opposite of that on which the reels are mounted, the deck being provided with an opening through which said motor shaft projects to frictionally engage said drive disc.

12. In a tape drive as defined in claim 1, further comprising contact means for frictionally abutting against each of the reels to prevent free rotation of the latter about the respective shafts of the reels.

13. In a tape drive as defined in claim 12, wherein said contact means comprises a pad; and resilient fingers mounted on the deck for resiliently urging the pads against respective reels.

* * * * *